United States Patent [19]

Saunders et al.

[11] 4,190,770

[45] Feb. 26, 1980

[54] BACKSCATTER INSTRUMENT HAVING INDEXING FEATURE FOR MEASURING COATING THICKNESS OF ELEMENTS ON A CONTINUOUSLY MOVING WEB OF SUBSTRATE MATERIAL

[75] Inventors: James Saunders, Pleasantville; William D. Hay, Peekskill; Jacques Weinstock, Flushing; Derek Lieber, North Merrick, all of N.Y.

[73] Assignee: Unit Process Assemblies, Inc., Syosset, N.Y.

[21] Appl. No.: 851,735

[22] Filed: Nov. 15, 1977

[51] Int. Cl.$^2$ .............................................. G01N 23/00
[52] U.S. Cl. ..................................... 250/308; 250/360
[58] Field of Search ........... 250/272, 273, 308, 358 R, 250/359, 360

[56] References Cited

U.S. PATENT DOCUMENTS

| | | | |
|---|---|---|---|
| 3,019,336 | 1/1962 | Johns | 250/308 X |
| 3,519,824 | 7/1970 | Weinstock et al. | 250/308 |
| 4,115,690 | 9/1978 | Weinstock et al. | 250/308 |

*Primary Examiner*—Davis L. Willis
*Attorney, Agent, or Firm*—Nims, Howes, Collison & Isner

[57] ABSTRACT

A backscatter measurement device for measuring the thickness of a coating on elements forming a web of substrate material moving from a feed supply to a take-up location at a predetermined speed. A measurement wheel is provided, adjacent to the rim of which is mounted a backscatter probe for irradiating and detecting the backscattered radiation from a coated substrate. The web of substrate material is threaded around the outer surface of the rim. The measurement wheel is rotated at a speed such that the tangential speed of a point on the rim equals the speed of the moving web whereby the probe and an adjacent point on the web are stationary relative to one another while the point on the web is adjacent the rim. Thus thickness measurements may be taken without stopping the movement of the coated web. This backscatter measurement device is further provided with indexing apparatus to position automatically the probe directly adjacent an element to be measured on the web.

9 Claims, 8 Drawing Figures

BACKSCATTER INSTRUMENT HAVING INDEXING FEATURE FOR MEASURING COATING THICKNESS OF ELEMENTS ON A CONTINUOUSLY MOVING WEB OF SUBSTRATE MATERIAL

BACKGROUND OF INVENTION

This invention relates to backscatter thickness measuring instruments and particularly to a device for measuring the thickness of a coating on an element forming a web of substrate material moving from a feed supply to a take-up location at a predetermined speed.

Backscatter instruments are used to measure thickness of a coating on a substrate by irradiating the coating and counting the particles backscattered therefrom. To make a measurement the user must position the probe, having both a source of radiation for irradiating the coating and apparatus for detecting the particles backscattered from the coatings, adjacent the coated substrate which is to be measured.

A backscatter measurement instrument is connected to the probe for counting the backscattered particles for a preselected time period and giving an indication of the coating thickness corresponding to this count. It is desirable that the probe and the coated substrate to be measured remain stationary with respect to one another during this measurement period. The longer this period of measurement the more accurate the result.

In the electronic industry manufacturers of coated substrates have developed efficient and economical processes for coating strips of substrate material. This is a highly developed art where coatings can be applied in the range of 30–100 micro inches with a high degree of uniformity. It has been determined that coating strips of substrate material is much more economical than coating substrates on a piece basis.

In recent years, there has been a particular need for an instrument for accurately measuring thickness of coatings on substrate materials, because gold is used for contact points in electronic circuits, and the price of gold has risen considerably. Accordingly, there has been an increased demand for accurate instruments to determine how much gold is being deposited in the coating process.

The process of coating webs of substrate material is a continuous one where the substrate material moves at a predetermined speed through the coating stage. Since the probe must be stationary with respect to the coated element on the web of substrate material during the backscatter thickness measurement period, it is necessary, with conventional instruments, to stop the coating process while the measurement is being made and then start it up again. This discontinuous stop and start process is quite time consuming and there has been a need for a device while could measure the coating thickness without having to stop the movement of the web of substrate material.

Apparatus for measuring the thickness of a continuous coating on a strip of substrate material is described in the pending U.S. patent applicaion Ser. No. 803,250 for Backscatter Instrument for Measuring Thickness of a Continuously Moving Coated Strip of Substrate Material. This apparatus, however, is not capable of measuring coating thickness on elements comprising a web of substrate material where the coated elements are separated from one another by a predetermined distance.

SUMMARY OF INVENTION

The present invention overcomes the disadvantages of conventional instruments by providing a measurement wheel for positioning a probe in stationary relation to a coated element of a web of substrate material to be measured while the web is moving from a feed supply to a take-up location at a predetermined speed.

A probe is mounted adjacent to the rim of the measurement wheel. The moving web of substrate material is fed onto the measurement wheel, threaded around the outer surface of the rim, stripped from the measurement wheel and directed to the take-up location. The measurement wheel is rotated at a speed such that the tangential speed of a point on the rim equals the speed of movement of the web of coated substrate material; thus, the probe and the coated element on the web to be measured move in stationary relation to one another until the coated element is stripped from the rim of the measurement wheel and advances to the take-up location.

While the probe is adjacent the portion of the coated element to be measured, the probe irradiates the coating and detects the backscattered radiation. A backscatter measuring instrument (not included in the present invention) is connected to the probe. This instrument counts the particles backscattered from the coating during the measurement period selected by the user and converts this backscatter count into indicia of coating thickness. The measurement period may be adjusted by the user, with an upper limit being the time it takes the portion of the coated strip of substrate material to be measured to move from its first engagement with the measurement wheel to the position where it leaves engagement with the measurement wheel.

Apparatus is provided for automatically aligning the probe with a coated element to be measured when the portion of the web carrying this element is first fed onto the measurement wheel. The coated elements are separated by a predetermined distance and the web includes index holes along one edge thereof which serve as a means for aligniing the probe with the element. The probe is carried by a probe head which is moved longitudinally with respect to the web until the probe head is properly positioned with respect to an index hole whereby the probe is properly positioned with respect to the coated element to be measured.

BRIEF DESCRIPTION OF THE DRAWINGS

In order that the invention may be clearly understood and readily carried into effect, a preferred embodiment will now be described, by way of example only, with reference to the accompanying drawings wherein.

DESCRIPTION OF A PREFERRED EMBODIMENT

Figure 1:
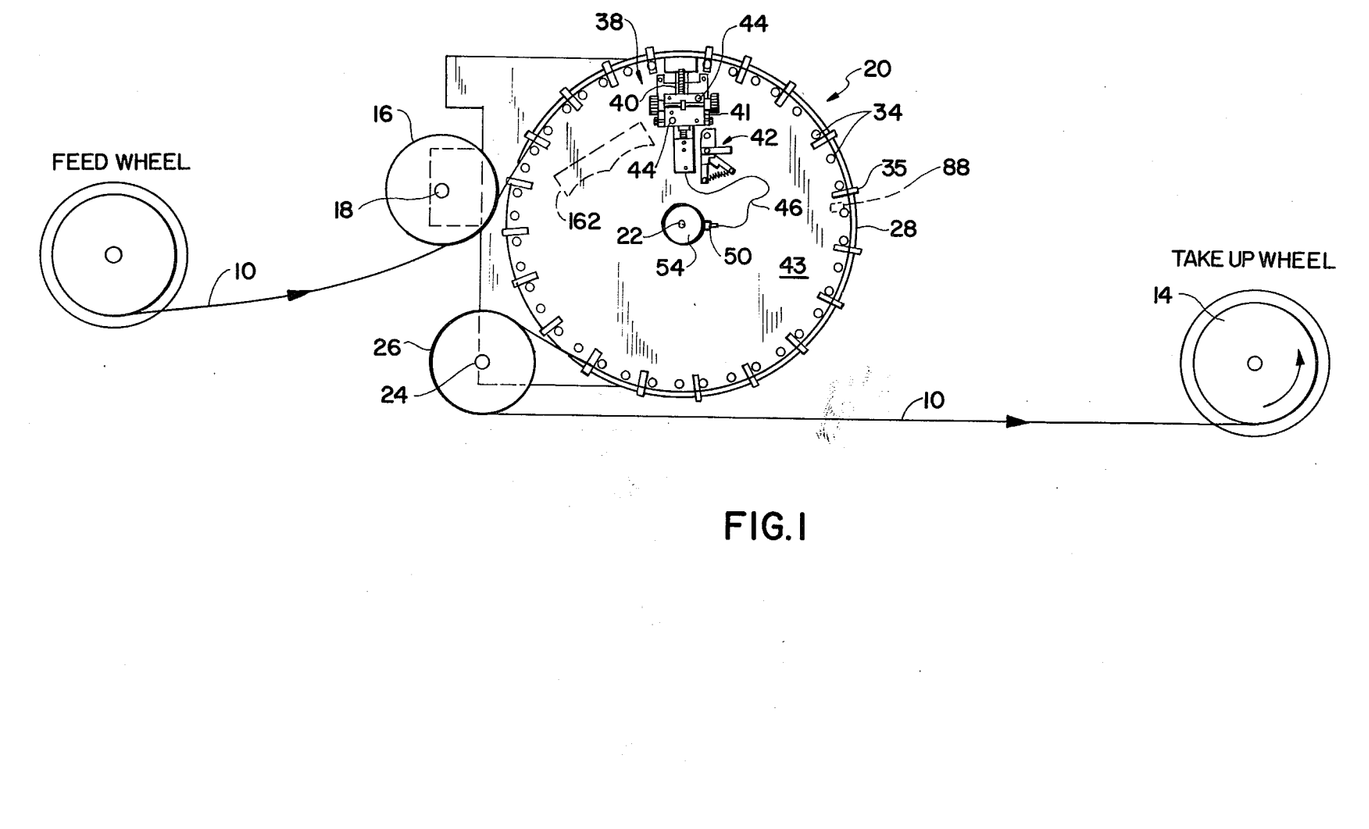
FIG. 1 is a schematic front view of the apparatus according to the present invention.

In the embodiment illustrated in FIG. 1, the path of a continuous web of coated substrate material 10 is shown moving from a supply (not shown) to a take-up reel 14 in the direction of the arrows. The supply may be, for example, plating tanks for coating substrate material.

The web 10 is threaded from the supply past a freely rotating guide wheel 16 mounted on axle 18, around a freely rotating measurement wheel 20 mounted on axle 22, around another freely rotating guide wheel 24 mounted on axle 26 and then to the take-up reel 14.

Figure 2:
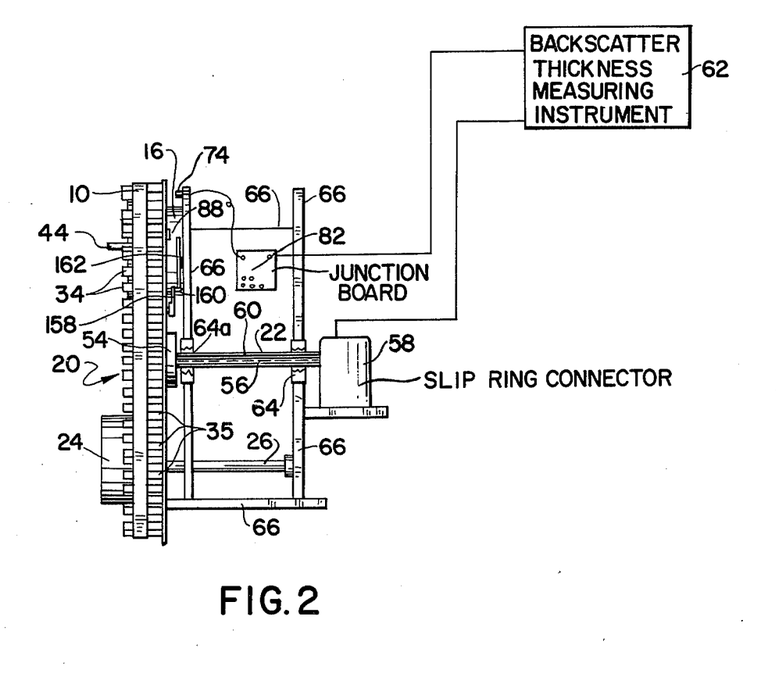
FIG. 2 is a schematic right hand side view of the apparatus illustrated in FIG. 1 omitting the take-up reel.
Figure 3:
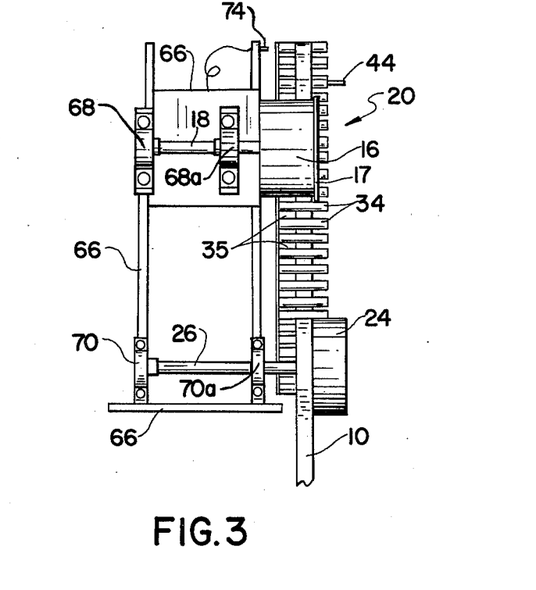
FIG. 3 is a schematic left hand view of the apparatus illustrated in FIG. 1.

In the preferred embodiment, take-up reel 14 is rotatably driven in the direction of the arrow by a motor (not shown). The web of substrate material travelling through the plating tanks is subject to drag forces which maintain the web 10 in tension when the web 10 is drawn to the take-up reel 14. The measurement wheel 20 has a rim 28 adjacent to which rubber covered rods 34 are mounted in spaced relation around the circumference of the wheel 20 in a direction parallel to the axis of the web measurement wheel 20 as shown in FIGS. 1 and 2. Between the rubber covered rods 34 are guide bars 35 for guiding an edge of the web 10 on the measurement wheel 20 as shown in FIG. 2. In addition, a guide rim 17 on guide wheel 16 guides the other edge of web 10 on the measurement wheel as shown in FIG. 3.

Since the web 10 is in tension, the web 10 when moving at a predetermined speed from the supply to the take-up reel 14 frictionally engages the rubber covered rods 34 and rotates the freely rotatable measurement wheel 20 about its axle 22. Thus the speed of rotation of the measurement wheel 20 is such that a point on the web 10 and adjacent point on the rim 28 of the measurement wheel 20 are stationary relative to one another while the web 10 moves around the axle 22 on measurement wheel 20.

Figure 6:
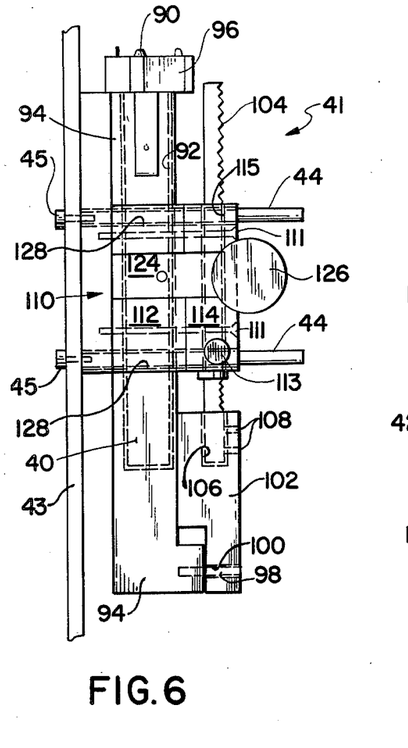
FIG. 6 is a side view of the probe holder shown in FIG. 5 in the direction of 6-6 in FIG. 5.

A probe assembly 38 includes a probe 40 shown schematically in FIG. 1. Probe 40 is mounted in probe holder 41 adjacent to rim 28 of measurement wheel 20. Actuating mechanism 42 automatically moves the probe 40 longitudinally with respect to web 10 to properly position the probe 40 adjacent to the element on the web 10 to be measured in a manner which will be described in detail below. This probe is of a construction such as Probe Model HH-3 manufactured by Unit Process Assemblies, Inc. and includes a source of radiation for irradiating the coated substrate and means for detecting the radiation backscattered from the coated substrate. The probe assembly 38 is releasably mounted to rods 44 attached to a backing disc 43 of measurement wheel 20 by means of screws 45 as shown in FIG. 6. This permits the probe 40 to be selectively positioned across the lateral face of the web and permits different probe assemblies 38 to be mounted on measurement wheel 20 according to the physical dimensions of the particular web 10 to be measured as will be described below.

The probe 40 is connected by wire 46 to socket 50 on hub 54. A cable 56 as shown in FIG. 2 connected to socket 50 carries electrical signals corresponding to the backscattered particles detected by probe 40 to slip ring connector 58 through a channel 60 grooved in axle 22. The other side of the slip ring connector 58 is connected to a backscatter thickness measuring instrument 62. This backscatter measuring instruments may be, for example, the instrument described in U.S. Patent Application Ser. No. 631,412 filed Nov. 12, 1975.

The axle 22 of measurement wheel 20 is supported by journal bearings 64 and 64a which in turn are supported by frame 66 as shown in FIG. 2. The axle 18 of guide wheel 16 is supported by journal bearings 68 and 68a and the axle 26 of guide wheel 24 by journal bearings 70 and 70a as shown in FIG. 2. These journal bearings are supported in turn by frame 66. In addition, the journal bearings 68 and 68a are constructed such as to permit axial movement of axle 18 supporting guide wheel 16 to accommodate different widths of web 10. Web 10 is guided around measurement wheel 20 between guide rim 17 of guide wheel 16 and guide bars 35. When the guide wheel 16 is moved to the right in FIG. 3 a wider strip 10 may be accommodated. Once the axle 18 is appropriately positioned, set screws (not shown) lock the axle 18 in this position.

The backscatter radiation counting apparatus included in the backscatter thickness measuring instrument 62 are actuated by the magnetic switch 74 mounted to the frame 66 on the backside of disc 43. This magnetic switch is electrically connected to the backscatter thickness measuring instrument 62 through the junction board 82 as shown in FIG. 2. A magnet 88 is mounted on the backside of disc 43 of measurement wheel 20 and in radial alignment with magnetic switch 74 such that when the measurement wheel 20 is rotated and magnet 88 passes adjacent to magnetic switch 74, the magnetic switch 74 switches to the "ON" position and actuates the backscatter thickness measurement instrument 62 to take a thickness measurement. When the magnet 88 goes beyond the magnetic switch 74, magnetic switch 74 is turned "OFF."

Figure 5:
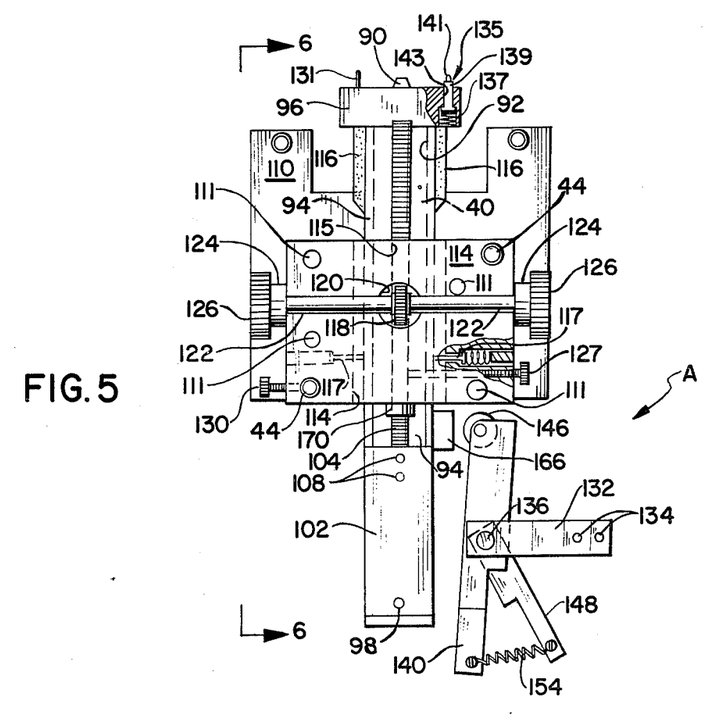
FIG. 5 is a front view of the probe holder and indexing mechanism shown in FIG. 4.

The probe 40 having a mask 90 is mounted in a bore 92 in probe holding assembly 94 as shown in FIGS. 5 and 6. The top portion of the probe 40 including the mask 90 is mounted in a probe head 96 as shown in FIG. 5. The probe 40 is secured in the bore 92 by means of a set screw (not shown). A pivot pin 98 is fixably mounted to the lower end of the probe holding assembly 94 as shown in FIG. 6. The other end of pivot pin 98 is received in a bore 100 formed in the lower end of a rack holding assembly 102. The bore 100 and pivot pin 98 are sized such that the probe holding assembly 94 may be pivoted about pivot pin 98 with respect to the rack holding assembly 102.

A rack 104 is mounted in a bore 106 formed in the rack holding assembly 102 and held in place by set screws 108 as shown in FIG. 6.

A base plate 110, rectangular block spacers 112 and front housing form the probe holder 41 shown in FIG. 1 and are provided to support the probe holding assembly 94 and rack 104 as shown in FIG. 6. The base plate 110, rectangular block spacers 112 and front housing 114 are secured to one another by screws 111. The front housing 114 has a bore 115 for movably receiving rack 104.

There is one rectangular block spacer 112 on each side of the probe holding assembly 94 and between them they define a channel 115, as shown in FIG. 5, within which the probe holding assembly 94 may slide. Two probe guides 116 are mounted on each side of probe holding assembly 94 as shown in FIG. 5 and center the probe holding assembly 94 within the channel 115 when the probe holding assembly 94 is moved downwardly as shown in FIG. 5.

Two conventional spring loaded plungers 117 are mounted in a bore in block spacers 112 which act against probe holding assembly 94 as shown in FIG. 5 to urge the probe holding assembly 94 to a central position in channel 115.

A pinion gear 118 is mounted in an opening 120 on the front housing 114 to engage the rack 104. The pinion gear 118 supported by an axle 122 which in turn is supported by two members 124 which are secured to opposite sides of the front housing 114 as shown in FIG. 5. Mounted on each end of axle 122 are thumb knobs 126 for manually rotating pinion gear 118. This rack and pinion arrangement may be used to raise or lower the probe 40 as shown in FIG. 5. When the desired position is reached a rack lock screw 127 is turned to engage the rack 104 and lock the rack in the selected position.

Each of the base plate 110, rectangular block spacers 112 and front housing 114 have aligned bores 128 for receiving the rods 44 as shown in FIG. 6. When mounting a probe assembly 38 to the measurement wheel 20 the bores 128 are aligned with rods 44 such that the bores 128 may receive the rods 44. After the probe assembly is properly positioned on the rods 44, as determined by the lateral position of the coated elements on the web 10 to be measured, the lock screw 130 is turned to engage a rod 44 as shown in FIG. 5 to lock the probe assembly 38 in place. When a different probe assembly 38 is to be used or the lateral position of the probe assembly 38 with respect to the web 10 is to be changed, the lock screw 130 is loosened to permit the probe assembly 38 to be moved with respect to the rods 44.

Figure 8:
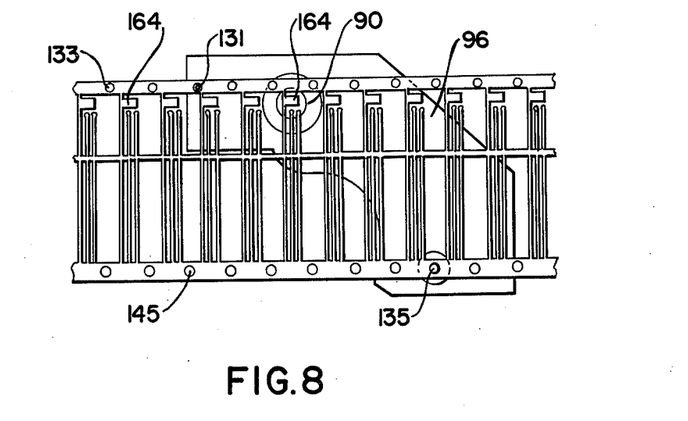
FIG. 8 is a top view of the probe head in engagement with the coated web according to the present invention.

The probe head 96 is shown in FIGS. 5 and 8 and includes a fixed pin 131 for engaging a first set of index holes 133 on one edge of web 10. A spring loaded pin 135 is mounted in probe head 96 as shown in FIG. 5. This spring loaded pin 135 has a spring 137, a plunger 139 with a tip 141 all mounted in bore 143 in probe head 96. The spring loaded pin 135 is normally biased by spring 137 in an upward direction as shown in FIG. 5 and is provided to engage the second set of index holes 145 as shown in FIG. 8. When the tip 141 of spring loaded pin 135 engages a portion of web 10 between index holes 145, the plunger 139 is moved downwardly and received in bore 143.

Figure 7:
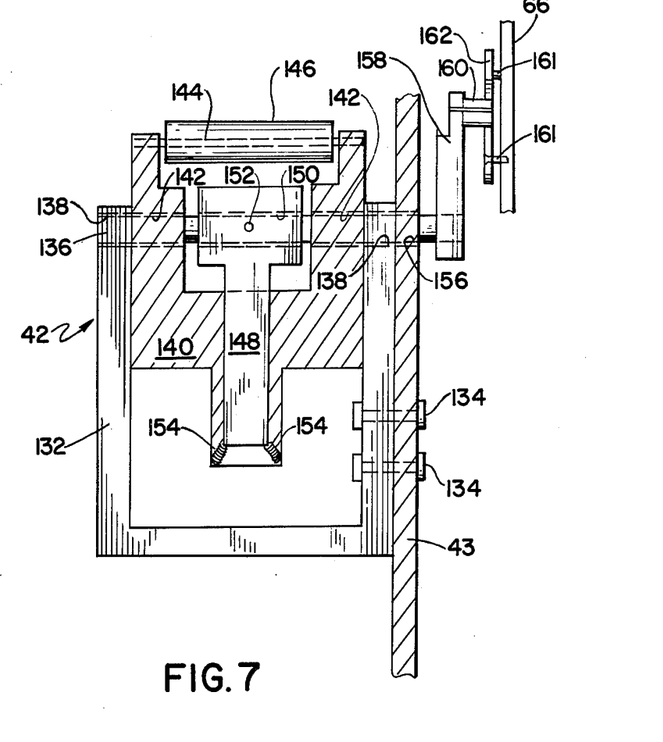
FIG. 7 is an oblique view of the cam actuated indexing mechanism in the direction of arrow "A" in FIG. 5 showing in addition the cam follower attached to the cam actuated indexing mechanism.

The actuating mechanism 42 is shown in FIGS. 5 and 7. A "U" frame 132 is secured to disc 43 by the threaded bolts with nuts 134 as shown in FIG. 7. The "U" frame 132 supports an axle 136 for free rotation in bores 138 in each leg of the "U" frame 132. Also mounted on axle 136 is an actuating member 140 having a general "Y" shape. Each of the upper legs of the member 140 have bores 142 for receiving the axle 136. The bores 142 are sized to permit free rotation of the axle 136 in these bores. The top portions of the legs of the actuating member 140 support an axle 144 between the two legs which in turn supports a cylindrical roller 146. The roller 146 is mounted for free rotation on axle 144.

An intermediate member 148 has a bore 150 for receiving axle 136. A set screw 152 is provided to lock the intermediate member 148 to the axle 136 whereby rotation of axle 136 causes pivotal movement of intermediate member 148 about the longitudinal axis of axle 136.

Two coiled springs 154 are provided each having one end attached to a lower portion of intermediate member 148 and the other end attached to the lower leg of actuating member 140.

The axle 136 extends through a bore 156 in the disc 43 to the rearward side of disc 43. At the rearward end of axle 136 (right hand side in FIG. 7) a cam follower arm 158 is fixably attached by a set screw (not shown). The cam follower arm 158 supports a cam follower 160 which is mounted on an axle off-set but parallel to the axis of the axle 136. This cam follower 160 engages a cam surface 162 as shown in FIG. 1 and FIG. 7. The cam surface is mounted to the frame 66 by screws and spacers 161 as shown in FIG. 7. As the cam follower 160 follows the cam surface 162, a torque is created on axle 136 causing axle 136 to rotate about its axis. The cam follower arm 158 and cam follower 160 move about the axis of measurement wheel 20 as the measurement wheel 20 is rotated. The cam follower 160 engages the cam surface 162 once each revolution of the measurement wheel 20.

The actuating mechanism 42 is used to automatically align the probe 40 with the coated element on web 10 to be measured. The operation of the actuating mechanism 42 will now be described. For purposes of illustration only the web 10 will have the configuration as shown in FIG. 8. It is understood that other web configurations may be used with this equipment. Only the probe head needs to be changed (together with the lateral spacing of guide wheel 16 depending on the width of the web 10). The web 10 as shown in FIG. 8 has a first set of index holes 133, a second set of index holes 145 and flag elements 164 which for this example are the coated elements to be measured. The geometry of the probe head 96 is such that the physical relationship of the spring loaded pin 135, the fixed pin 131 and probe mask 90 is the same as the physical relationship of the second index holes 145, the first index holes 133 and the flags 164, respectively. Thus when the spring loaded pin 135 engages one of the second set of index holes 145, the fixed pin 131 engages one of the first set of index holes 133 and the probe mask 90 is in adjacent alignment with the flag 164.

To make a measurement the rack and pinion arrangement of probe assembly 38 is used to position the probe mask 90 adjacent the coated element to be measured. This is done while the measurement wheel 20 is at rest. The rack lock screw 127 is then used to lock the probe assembly 38 in this position. The motor turning the take-up reel 14 is then actuated and the measurement wheel 20 begins to turn. As the probe assembly 38 moves past the guide wheel 24, the web 10 is stripped away from the measurement wheel 20 and the probe assembly 38.

As the probe assembly 38 approaches the point where the web 10 is being fed onto the measurement wheel 20 the cam follower 160 approaches the cam surface 162. The spring loaded pin 135 mounted on probe head 96 is the first portion of the probe head 96 to engage the web 10.

Assume for purposes of description that this spring loaded pin 135 engages a portion of the web 10 between two of the second set of index holes 145. In this case, the web causes the plunger 139 to be moved downwardly into bore 143.

The cam follower 160 now begins to follow cam surface 162 and begins to rotate axle 136. This rotation causes intermediate member 148 to pivot about axle 136, and through the springs 154, causes the actuating member 140 to be drawn in rotational movement about axle 136. This causes roller 146 to engage a bearing plate 166 mounted on probe assembly 94 as shown in FIG. 5. The roller 146 engaging bearing plate 166 causes the probe holding assembly 94 to be pivoted in a left hand direction in FIG. 5 about axle 98. This pivotal movement of probe holding assembly 94 causes the probe head 96 to move along the longitudinal axis of the web 10 until the tip 141 of spring loaded pin 135 mounted in probe head 96 engages a hole of the second set of index holes 145 as shown in FIG. 8. When this occurs the pivoted movement of the probe holding assembly 94 is stopped by the reaction force on the spring loaded pin 135 which has been inserted in one of the index holes 145. The coiled springs 154 permit relative movement between the intermediate member 143 and the actuating member 140 and allows the intermediate member 148 to continue to pivot about the axis of axle 136 as the cam follower 160 continues to follow cam surface 162 even though the spring pin 135 has stopped pivotal movement of the probe holding assembly 94 and thus the actuating member 140.

When the spring loaded pin 135 engages one of the holes of the second set of index holes 145, the probe mask 90 is properly positioned to be aligned with the flag 164. As the web 10 continues to be fed onto the measurement wheel 20 the probe mask 90 is positioned adjacent the flag 164 and the pin 131 engages a hole in the first set of index holes.

The measurement period may now commence. This is accomplished by magnet 88 passing adjacent the magnetic switch 74. The magnet 88 is positioned on measurement wheel 20 to initiate the measurement cycle just after the probe mask 90 is positioned adjacent the flag 164 to be measured. The measurement continues for the duration of the measurement period selected by the user on the backscatter instrument 62.

When the web 10 is stripped from the measurement wheel 20 by guide wheel 24, the pin 131 prevents the probe head 94 and thus the probe mask 90 from scraping across the coated surface of the flag 164 when the web 10 is stripped from the spring loaded pin 135. This scraping would otherwise occur because positioning plungers 117 urge the probe holding assembly 94 into a central position within channel 115 in preparation for the next indexing operation. The web 10 is stripped from the probe mask 90 and finally the pin 131. The probe assembly 38 and indexing assembly 42 are now in position to properly align the probe 40 for the next measurement.

With the above described device, a user may make thickness measurements of a coated element on a web of substrate material moving continuously. Thus, measurements can be made on-line to monitor the coating process.

The above described device is a preferred embodiment. However, it is understood that the indexing means on web 10, which in the preferred embodiment were index holes 145, may be other means such as bars, tabs, indents, etc. Also locating means for engaging the indexing means to align the probe 40 would take the form of a device for engaging the corresponding indexing means. In the preferred embodiment the spring loaded pin 135 was the locating means for engaging the index holes 145.

Furthermore, it is contemplated that the probe assembly 38 may be removed from rods 44 and a different probe assembly 38 be substituted to conform with the parameters of a web 10 having a different configuration.

Figure 4:
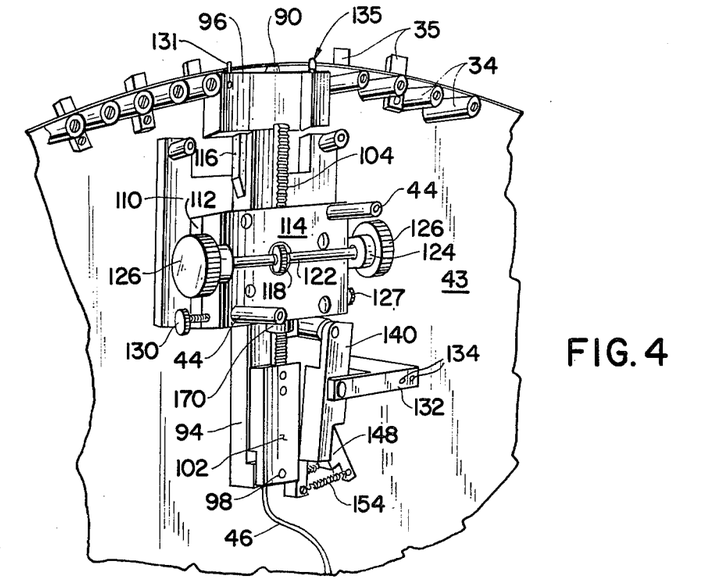
FIG. 4 is a perspective view of the probe holder and cam actuated indexing mechanism according to the present invention.

The degree of engagement of the probe mask 90 on an element on web 10 may be limited by a collar 170 with a set screw (not shown) located on racks 104 as shown in FIGS. 4 and 5. The collar 170 limits the upward movement of probe head 96. Thus a user can pre-adjust the degree of engagement between probe mask 90 and an element on web 10. When this probe assembly 38 is mounted on rods 44, the probe head 96 is simply moved upwardly until the collar 170 engages the bottom surface of the front housing 114. The probe head 96 will then be properly positioned with the pre-selected degree of engagement with an element on web 10.

Similarly with set screws (not shown) the lateral position of probe head 96 with respect to web 10 may be adjusted and maintained. These set screws would be provided in probe assembly 38 and would be positioned to extend from probe assembly 38 and engage the disc 43 to determine the lateral position of the probe assembly 38 on rods 44. Thus the lateral position of the probe head 96 with respect to web 10 may be pre-set which would facilitate the mounting and adjustment of a different probe assembly 38 for a different web configuration. The user would simply remove one probe head assembly 38 and replace it with a proper probe assembly 38 and move the probe assembly 38 towards the disc 43 on rods 44. When the set screw engages disc 43, the lock screw 130 is then locked to rods 44 to hold the probe assembly 38 in the proper lateral position.

While the fundamental novel features of the invention have been shown and described, it should be understood that various substitutions, modifications and variations may be made by those skilled in the art without departing from the spirit or scope of the invention. Accordingly, all such modifications and variations are included in the scope of the invention as defined by the following claims.

We claim:

1. In a backscatter measuring device for measuring the thickness of a coating on an element of substrate material forming a portion of a web, the web having indexing means along an edge thereof and being moved continuously from a feed supply to a take-up location the improvement comprising:

a probe head having a probe means for irradiating the coating on the coated substrate material and detecting the backscatter radiation during a measurement period and having locating means for engaging the indexing means;

the probe means and the locating means being positioned on the probe head in the same relation as the element to be measured and the indexing means are positioned on the web;

a probe holding assembly for holding the probe head in adjacent relation with the web during the measurement period and being mounted to move the probe head along the longitudinal axis of the web;

means for causing the probe holding assembly to move the probe head along the longitudinal axis of the web just prior to the measurement period until the locating means engages the indexing means whereby the probe means is properly aligned with the coated element to be measured.

2. The improved backscatter measuring device according to claim 1 wherein the indexing means comprise index holes and the locating means comprises a spring loaded pin.

3. The improved backscatter measuring device according to claim 1 further including means for selectively positioning the probe head laterally across the web.

4. A backscatter measuring device for measuring the thickness of a coating on an element of substrate material forming a portion of a web, the web having indexing means along an edge thereof and being moved continuously at a predetermined speed from a feed supply to a take-up location comprising:

a measurement wheel having a rim and an axle of rotation and being rotated at a speed of rotation such that the tangential speed of a point on the rim is equal to the predetermined speed of the moving webs;

means for feeding the web into frictional engagement with an outer portion of the rim in a direction such that the direction of movement of the web corresponds to the direction of rotation of the rim whereby a point on the rim of the measurement wheel and an adjacent point on the web are stationary relative to one another while the measurement wheel is rotating;

a probe head having a probe means for irradiating the coating on the coated substrate material and detecting the backscatter radiation during a measurement period and having locating means for engaging the indexing means;

the probe means and the locating means being positioned on the probe head in the same relation as the element to be measured and the indexing means are positioned on the web;

a probe holding assembly mounted adjacent a rim of the measurement wheel for holding the probe head in adjacent relation with the web during the measurement period and being mounted to move the probe head along the longitudinal axis of the web on the measurement wheel;

actuating means for causing the probe holding assembly to move the probe head along the longitudinal axis of the web just prior to when the element of the web to be measured is about to engage the outer portion of the rim on the measurement wheel until the locating means engages the indexing means whereby the probe means is properly aligned with the coated element to be measured.

5. The device according to claim 4 wherein the indexing means comprises index holes and the locating means comprises a spring loaded pin.

6. The device according to claim 4 wherein the probe holding assembly is mounted for pivotal movement and the actuating means includes means for pivoting the probe holding assembly.

7. The device according to claim 6 wherein the axle of the measurement wheel is mounted on a frame supporting the measurement wheel and further including a cam surface mounted on the frame and wherein the means for pivoting the probe holding assembly includes a cam follower mounted to the measurement wheel to pivot the probe holding assembly when the cam follower follows the cam surface.

8. The device according to claim 4 further including stripping means for stripping the web from the measurement wheel prior to the web travelling to the take-up location and further including means for preventing relative movement between the probe means and the element of substrate material on the web being measured until the element is stripped away from the probe means on the measurement wheel.

9. The device according to claim 4 further including means for selectively positioning the probe head laterally across the web.

* * * * *

UNITED STATES PATENT AND TRADEMARK OFFICE
CERTIFICATE OF CORRECTION

PATENT NO. : 4,190,770
DATED : February 26, 1980
INVENTOR(S) : James Saunders et al It is certified that error appears in the above—identified patent and that said Letters Patent is hereby corrected as shown below:

Col. 2, line 44, change "aligniing" to --aligning--;

Col. 4, line 57, after "housing" insert --114--.

Signed and Sealed this

Tenth Day of June 1980

[SEAL]

Attest:

SIDNEY A. DIAMOND

Attesting Officer    Commissioner of Patents and Trademarks